(12) United States Patent
Geng et al.

(10) Patent No.: US 11,495,231 B2
(45) Date of Patent: Nov. 8, 2022

(54) LIP LANGUAGE RECOGNITION METHOD AND MOBILE TERMINAL USING SOUND AND SILENT MODES

(71) Applicant: BOE TECHNOLOGY GROUP CO., LTD., Beijing (CN)

(72) Inventors: Lihua Geng, Beijing (CN); Xitong Ma, Beijing (CN); Zhiguo Zhang, Beijing (CN)

(73) Assignee: BEIJING BOE TECHNOLOGY DEVELOPMENT CO., LTD., Beijing (CN)

( * ) Notice: Subject to any disclaimer, the term of this patent is extended or adjusted under 35 U.S.C. 154(b) by 578 days.

(21) Appl. No.: 16/346,815

(22) PCT Filed: Nov. 26, 2018

(86) PCT No.: PCT/CN2018/117426
§ 371 (c)(1),
(2) Date: May 1, 2019

(87) PCT Pub. No.: WO2019/134463
PCT Pub. Date: Jul. 11, 2019

(65) Prior Publication Data
US 2021/0280191 A1 Sep. 9, 2021

(30) Foreign Application Priority Data
Jan. 2, 2018 (CN) .......................... 201810004216.3

(51) Int. Cl.
H04M 3/56 (2006.01)
H04M 1/02 (2006.01)
(Continued)

(52) U.S. Cl.
CPC .............. *G10L 15/25* (2013.01); *G06F 3/165* (2013.01); *G06K 9/6256* (2013.01); *G06N 3/08* (2013.01);
(Continued)

(58) Field of Classification Search
CPC .......... G06K 9/00308; G06K 9/00281; H04M 1/0264; G10L 21/06; G10L 13/00; G10L 15/24; G09C 5/00; G06F 1/3231
(Continued)

(56) References Cited

U.S. PATENT DOCUMENTS 5,680,481 A * 10/1997 Prasad ............... G06K 9/00281
382/190
2003/0028380 A1* 2/2003 Freeland .................. G10L 13/00
704/260
(Continued)

FOREIGN PATENT DOCUMENTS

CN 102117614 A 7/2011
CN 102670206 A 9/2012
(Continued)

OTHER PUBLICATIONS

International Search Report in Application No. PCT/CN2018/117426, dated Feb. 27, 2019.
(Continued)

*Primary Examiner* — Farzad Kazeminezhad
(74) *Attorney, Agent, or Firm* — Syncoda LLC; Feng Ma

(57) ABSTRACT

A lip language recognition method, applied to a mobile terminal having a sound mode and a silent mode, includes: training a deep neural network in the sound mode; collecting a user's lip images in the silent mode; and identifying content corresponding to the user's lip images with the deep neural network trained in the sound mode. The method
(Continued)

further includes: switching from the sound mode to the silent mode when a privacy need of the user arises.

19 Claims, 2 Drawing Sheets

(51) Int. Cl.
| | |
|---|---|
| *G10L 21/06* | (2013.01) |
| *G09C 5/00* | (2006.01) |
| *G10L 13/00* | (2006.01) |
| *G06F 1/3231* | (2019.01) |
| *G10L 15/25* | (2013.01) |
| *G06F 3/16* | (2006.01) |
| *G06K 9/62* | (2022.01) |
| *G06N 3/08* | (2006.01) |
| *G10L 13/033* | (2013.01) |
| *G10L 15/02* | (2006.01) |
| *G10L 15/06* | (2013.01) |
| *G10L 15/16* | (2006.01) |
| *G10L 15/22* | (2006.01) |
| *H04R 1/08* | (2006.01) |
| *H04R 1/10* | (2006.01) |
| *G06V 40/16* | (2022.01) |

(52) U.S. Cl.
CPC ........ *G06V 40/171* (2022.01); *G10L 13/0335* (2013.01); *G10L 15/02* (2013.01); *G10L 15/063* (2013.01); *G10L 15/16* (2013.01); *G10L 15/22* (2013.01); *H04R 1/08* (2013.01); *H04R 1/10* (2013.01); *H04R 2499/11* (2013.01)

(58) Field of Classification Search
USPC .................................. 704/275, 260; 345/161
See application file for complete search history.

(56) References Cited

U.S. PATENT DOCUMENTS

| | | | | |
|---|---|---|---|---|
| 2004/0243416 | A1* | 12/2004 | Gardos | ................... G10L 21/06 |
| | | | | 704/275 |
| 2012/0075184 | A1* | 3/2012 | Madhvanath | ........... G10L 15/24 |
| | | | | 345/161 |
| 2014/0043498 | A1* | 2/2014 | Lee | ........................ G06F 1/3231 |
| | | | | 348/222.1 |
| 2017/0264830 | A1* | 9/2017 | Udodov | .............. H04M 1/0264 |
| 2018/0157333 | A1* | 6/2018 | Ross | ........................ G06F 3/013 |
| 2018/0205550 | A1* | 7/2018 | Appleyard | ............... G09C 5/00 |
| 2020/0106884 | A1* | 4/2020 | Miyamoto | ......... G06K 9/00308 |

FOREIGN PATENT DOCUMENTS

| | | |
|---|---|---|
| CN | 102920461 A | 2/2013 |
| CN | 104484041 A | 4/2015 |
| CN | 104484656 A | 4/2015 |
| CN | 105528525 A | 4/2016 |
| CN | 105825167 A | 8/2016 |
| CN | 107293300 A | 10/2017 |

OTHER PUBLICATIONS

CN First Office Action in Application No. 201810004216.3, dated Nov. 1, 2019.

* cited by examiner

LIP LANGUAGE RECOGNITION METHOD AND MOBILE TERMINAL USING SOUND AND SILENT MODES

CROSS-REFERENCE TO RELATED APPLICATIONS

The present application is a continuation of, and claims priority to Chinese Patent Application No. 201810004216.3 filed on Jan. 2, 2018, the disclosure of which is hereby incorporated by reference in its entirety.

TECHNICAL FIELD

Various embodiments of the present disclosure relate to the field of mobile communication technologies, and more specifically to a lip language recognition method and a mobile terminal.

BACKGROUND

Wireless communications have become a dominant way of inter-personal communicating. Mobile terminals such as mobile phones and tablet computers with call functions can realize voice calls through conventional cellular network with or without various applications ("apps"). A user can speak to a microphone of a mobile terminal, and be heard on another mobile terminal or landline telephone through a communication network.

SUMMARY

The inventors of the present disclosure have recognized that, during an actual voice call for example through mobile phone communication, its content has, in many cases, private information. A vocal conversation involving private content cannot protect the privacy of the user. On the other hand, many occasions are not suitable for answering calls, such as during a meeting or in a library. Making a vocal call in such occasions will inevitably affect the normal activities of the surrounding people.

In order to solve above technical problems, some embodiments of the present disclosure provide a lip language recognition method and a mobile terminal, which can protect not only the privacy of users, reduce disturbance of activities of surrounding people, but also save training time and improve training accuracy.

In a first aspect, a lip language recognition method is provided. The method can be applied to a mobile terminal having a sound mode and a silent mode, and includes: training a deep neural network in the sound mode; collecting a user's lip images in the silent mode; and identifying content corresponding to the user's lip images with the deep neural network trained in the sound mode.

In some embodiments, the training comprises: collecting lip images and corresponding voice data for training; obtaining image data corresponding to the collected lip images for training, the image data comprising pixel information; and training the deep neural network based on the image data and the voice data for training.

In some embodiments, the training of the deep neural network includes: collecting lip images and corresponding voice data for training; obtaining image data corresponding to the collected lip images for training, the image data comprising pixel information; obtaining text encoding corresponding to the voice data for training; and training the deep neural network based on the image data and the text encoding for training.

In some embodiments, the identifying the content corresponding to the user's lip images with the deep neural network includes: obtaining user image data corresponding to the user's lip images; and identifying user text encoding corresponding to the user's lip images by applying the deep neural network on the user image data.

In some embodiments, the method further includes extracting the user's voice features based on the voice data for training.

In some embodiments, the user's voice features include at least one of tone color, pitch, or volume.

In some embodiments, the method further includes synthesizing user voice data having the user's voice features based on the extracted user's voice features and the content corresponding to the user's lip images.

In another aspect, a mobile terminal is provided having a sound mode and a silent mode. The mobile terminal includes: an acquisition portion; and a processing portion; wherein: the acquisition portion is configured to acquire a user's lip images in the silent mode; and the processing portion is in communication with the acquisition portion and configured to identify content corresponding to user's the lip images with a deep neural network established in the sound mode.

In some embodiments, in the sound mode, the acquisition portion is configured to collect, with an imaging device and a microphone device, lip images and corresponding voice data for training; and the processing portion is configured to: obtain image data including pixel information based on the collected lip images for training; and train the deep neural network according to the image data and the voice data for training.

In some embodiments, the acquisition portion is configured to acquire lip images and corresponding voice data for training in the sound mode; the processing portion is configured to: obtain image data corresponding to lip images for training; obtain text encoding for training corresponding to the voice data for training; and train the deep neural network according to the image data and the text encoding for training.

In some embodiments, the processing portion is further configured to identify the text encoding for training using the deep neural network.

In some embodiments, the mobile terminal further includes a feature extraction portion configured to obtain a user's voice features according to the voice data for training; wherein the voice features include at least one of tone color, pitch, or volume.

In some embodiments, the mobile terminal further includes a speech synthesis portion configured to synthesize voice data with the user's voice features according to the obtained voice features and the identified content.

In some embodiments, the acquisition portion includes an imaging device disposed at a bottom portion of the mobile terminal.

In some embodiments, the mobile terminal further includes: a sending portion configured to encode the synthesized voice data and send the encoded synthesized voice data to a communication station wirelessly; a receiving portion configured to receive a signal from the communication station and perform decoding and conversion into user-recognizable voice data; and an earpiece configured to play the user-recognizable voice data decoded and converted by the receiving portion.

In another aspect, a non-transitory computer-readable medium is provided having instructions stored thereon for execution by the mobile terminal for lip language recognition, the instructions including: an imaging device capturing the lip images for training in a voice communication; a microphone collecting the voice data corresponding to the lip images for training; the processing portion obtaining the image data according to the lip images and text encoding corresponding to the voice data, and training the deep neural network based on the image data and the text encoding; saving training results to guide the lip image recognition in the silent mode; and a feature extraction portion extracting from the voice data user's voice features and saving the extracted voice features.

In some embodiments, the instructions further include: the processing portion identifying the text encoding from the user's image data using the trained deep neural network, and transmitting the recognized text encoding to the speech synthesis portion; the speech synthesis portion synthesizing voice data having the voice features based on the voice features saved in the sound mode and the recognized text encoding; the sending portion encoding and sending the voice data having the voice features to a communication station wirelessly; and the receiving portion receiving from the communication station the voice for decoding.

In some embodiments, the instructions further include: downloading sound recording; the feature extraction portion extracting sound features from the downloaded sound recording; and mixing the extracted sound features with the saved voice features prior to the synthesizing.

In some embodiments, the instructions further include: obtaining user feedbacks on the text encoding for training; and training the deep neural network with the obtained user feedbacks.

In some embodiments, the instructions further include: starting the silent mode with a user input of a key phrase; wherein the key phrase is recognized by the mobile terminal through the user's lip movements without associated voice.

Therefore, various embodiments of the present disclosure provide a lip language recognition method and a mobile terminal. The lip language recognition method is applied to the mobile terminal, wherein the mobile terminal is provided with a sound mode and a silent mode. In the sound mode, the lip language recognition method includes training a deep neural network. In the silent mode, the method includes starting the silent mode; collecting a user's lip images; and identifying the content corresponding to the lip images according to the deep neural network, wherein the deep neural network is established in the sound mode.

In the technical solutions provided by some the embodiments of the present disclosure, a deep neural network is trained in a sound mode, and in a silent mode, the content corresponding to lip images is identified according to the deep neural network trained in the sound mode. The lip language recognition method according to some embodiments solves the technical problems in the prior art when a user performs a voice call in public, where the user's privacy is not protected and the surrounding people may be disturbed. The lip language recognition method can protect the user's privacy, reduce the impact on the normal activities of the surrounding people, and save training time and improve training accuracy.

Apparently, implementing any of the products or methods of the present disclosure does not necessarily require the simultaneous achievements of all the advantages described above. Other features and advantages of various embodiments the present disclosure can become apparent in view of in the subsequent examples in the detailed description.

BRIEF DESCRIPTION OF THE DRAWINGS

To more clearly illustrate various embodiments of the disclosure, the following is a brief description of the attached drawings, which are for illustrative purpose only. For those of ordinary skills in the art, other drawings of other embodiments can become apparent based on these drawings.

DETAILED DESCRIPTION

Figure 1:
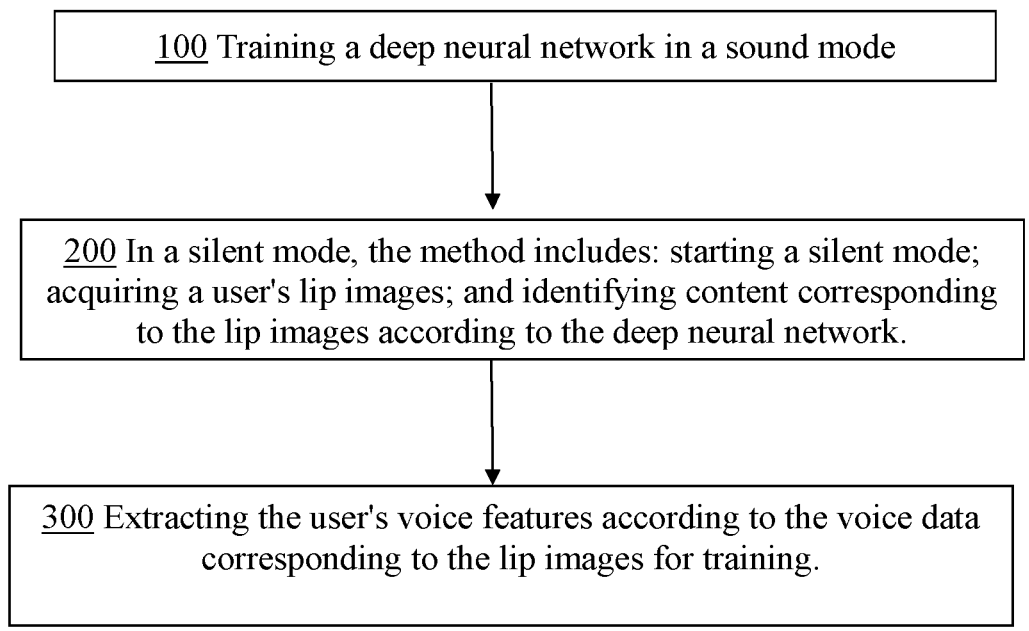
FIG. 1 is a flowchart of a lip language recognition method according to some embodiments of the present disclosure.

In the following, with reference to the drawings of various embodiments disclosed herein, the technical solutions of the embodiments of the disclosure will be described in a clear and fully understandable way. It is apparent that the described embodiments are merely a portion but not all of the embodiments of the present disclosure. Based on the described embodiments of the disclosure, those ordinarily skilled in the art can obtain other embodiment(s), which come(s) within the scope sought for protection by the disclosure.

In the following descriptions, with respect to server(s), device(s), group(s), system(s), terminal(s), file(s), etc., in some occurrences singular forms are used, and in some other occurrences plural forms are used in the descriptions of various embodiments. It should be noted, however, the single or plural forms are not limiting but rather are for illustrative purposes. Unless it is expressly stated that a single server, device, group, system, terminal, or file etc. is employed, or it is expressly stated that a plurality of servers, devices, groups, systems, terminals, or files, etc. are employed, the server(s), device(s), group(s), system(s), terminal(s), file(s), etc. can be singular, or plural.

In some of the embodiments described below, a communication connection can be established among various devices such as terminals and servers. The communication connection may include a connection through a wireless network, a wired network, and/or any combination of a wireless network and a wired network.

The network may include a local area network (LAN), the Internet, a telecommunications network, an internet of things (IoT) and/or telecommunications-network-based IoT, and/or any combinations of the above networks.

For example, the wired network may employ wires, twisted pair wires, coaxial cables, or optical fiber transmissions to transmit information. In some other examples, the wireless network may employ a WWAN mobile communication network, Bluetooth, Zigbee, or WiFi.

In some embodiments, a processing circuit may be employed to execute instructions to realize various methods and functions according to various embodiments disclosed herein. The processing circuit can have a modular configuration and is sometimes referred to as a processing module.

In some other embodiments, the processing circuit does not necessarily have a modular configuration.

For example, the processing circuit may be implemented by a processor that performs logic operations, such as a central processing unit (CPU), a field programmable logic array (FPGA), a digital signal processor (DSP), a microcontroller (MCU), or Application-Specific Integrated Circuits (ASICs), and other devices with data processing capabilities and/or program execution capabilities.

It will be readily understood that the processing circuit may include memory on which a computer program product is stored, and the memory may include various forms of computer-readable storage media, such as volatile memory and/or non-volatile memory. Volatile memory may include, for example, random access memory (RAM) and/or cache. Non-volatile memory may include, for example, read-only memory (ROM), hard disk, EPROM, USB memory, flash memory, and other non-transitory computer-readable medium.

One or more computer instructions can be stored on the memory, and the processor can run the computer instructions to realize various functions. Various applications and various data may also be stored in a computer-readable storage medium, such as various data used or generated by the applications.

Each module, block, or circuit portion can be provided with a communication connection circuit to complete a communication connection, to thereby perform a communication function.

In various embodiments described below, a sliding-type mobile terminal may sometimes be employed as an example. However, those of ordinary skill in the art will understand that other types of mobile terminals such as a bar-type, a swing-type, a fold-type mobile terminal, and the like can also be used as part of the embodiments. That is, various embodiments of the present disclosure can be applied to any type of mobile terminals and are not limited to a sliding-type mobile terminal.

FIG. 1 shows a flowchart of a lip language recognition method according to some embodiments of the present disclosure. The lip language recognition method can be applied to a mobile terminal, which can be implemented with a sound mode and a silent mode. As shown, the method can include the following steps.

Step 100: Training a deep neural network in a sound mode.

In some embodiments, the sound mode refers to a user making a voice call, speaking to the microphone of the mobile terminal to dictate, for recording, for converting into text, to give a voice command, to play games, or for training one or more apps associated with the mobile terminal, etc. The one or more apps associated with the mobile terminal can be stored on the mobile terminal (e.g., downloaded by the user), or can be in a cloud and accessible through a communication network.

In some embodiments, step 100 includes: obtaining lip images and their associated voice data for training; obtaining corresponding image data based on the lip images for training; and training the deep neural network based on the image data and the voice data. It is noted that in some embodiments the lip images and their associated voice data can be those of dedicated "training sessions," or can be anytime the user speaks to the microphone and the user's privacy terms allow.

In some embodiments, the training of the deep neural network can be realized locally, such as through a built-in or downloaded app stored on the mobile terminal. In some other embodiments, the training of the deep neural network can be realized in a cloud, such as remotely through one or more servers or other terminals that collectively have more computing power than the local mobile terminal itself.

Particularly in the case of training and/or using the deep neural network in a cloud, user's privacy may be a concern, because the real user's identity can potentially be made public through the Internet. Therefore, according to some embodiments of the disclosure, the user's identity can be replaced with a user identifier to protect the user's real identity.

In some embodiments, step 100 includes: obtaining lip images and their associated voice data for training; obtaining corresponding image data based on the lip images for training, where the image data include pixel information; obtaining corresponding text encoding based on the voice data corresponding to the lip images for training; and training a deep neural network based on the image data and the text encoding.

In some embodiments, more specifically the image data include pixel information.

In addition, it should be noted that with prolonged use of the user's sound mode, the training of the deep neural network will become more sufficient, and the recognized content corresponding to the lip images will become more accurate.

In some embodiments, the deep neural network is trained in the sound mode by collecting the lip images and voice data for training, and no special training time period is required to train the deep neural network. For example, the training does not have to be separate or interfere the user's normal interactions with the mobile terminal, but can be an integral part of user's daily activities, such as chatting, dictation, searches, voice calls, voice commands, game playing, social media posting, etc. This not only simplifies the operation of lip language recognition and makes personalized lip language recognition possible, but also saves training time and improves training accuracy.

Step 200: When a silent mode is started, the method can include: obtaining a user's lip images; and identifying the content corresponding to the lip images according to the trained deep neural network.

In some embodiments, the deep neural network is previously established in the sound mode as described above. The lip images obtained by the mobile terminal during the sound mode may be referred to as "lip images for training." However, it should be noted that the lip images for training are not necessarily separate from those obtained during regular user activities. For example, when the user is giving voice commands, dictating, or make a regular voice call on the mobile terminal, with the user's permission, the mobile terminal can obtain the corresponding lip languages to train the deep neural network.

In some embodiments, the deep neural network can use the user's feedback, such as the user's correcting texts from voice-to-text functions of the mobile terminal, during the learning process to establish the deep neural network.

According to some embodiments, during any time the user feels there is a potential privacy concern, the user can choose to stop the mobile terminal from obtaining the lip images, or transmitting the lip images through the communication network to, for example, the cloud.

The silent mode may be a mode that the user does not need to speak with voice, but rather moves the lips as if speaking in the normal sound mode. The content corresponding to the lip motions, which the user wishes to communicate, is recognized from the user's lip images.

In some embodiments, a condition for activating the silent mode is a lip-language recognition "ON" instruction as input by the user. For example, the user input to turn on the lip-language recognition can be clicking a preset virtual button on a display screen, a gesture recognizable by the mobile terminal, a touch-screen input such as sliding a predetermined pattern on the touch screen, or a voice instruction to start lip-language recognition.

In some other examples, the user input to turn on the lip-language recognition can be speaking to the local terminal in a voice that contains a predetermined set of key words, key phrases, or key sentences. Such key words, phrases, or sentences can include, for example, "it is inconvenient for me to speak now," "silent mode," or "secret," etc. When the words "silent mode," "secret," or "inconvenient" is recognized in the voice, the lip-language recognition function (and the silent mode) is turned on.

In some other embodiments, the silent mode can be started when the user started making lip movements, which are recognizable by the mobile terminal, without making associated sound. For example, during a voice call, the user uses lip movements as if speaking a key phrase such as "silent mode" without a voice, the mobile terminal (if so configured with the user's permission) recognize the key phrase with the lip images without the voice, and starts the silent mode.

In some embodiments, the silent mode can be started during the sound mode, such as during a voice call. The voice call can be between mobile terminals as a conventional telephone call, or can be through software or communication apps such as WhatsApp, Snapchat, Skype, WeChat, QQ, or other Internet communication or social media software. The platform for such voice calls or software to communicate among communication terminals can include, for example, a mobile phone, a computer, or a tablet computer, etc.

In some embodiments, the content corresponding to the lip images can include voice data or text encoding corresponding to the lip language images. It should be noted that the content corresponding to the lip language images can be determined according to the training method for the deep neural network.

For example, in some embodiments the content corresponding to the lip images is voice data, if the deep neural network is trained to provide the voice data from the lip images. In some other embodiments, the content corresponding to the lip images is text encoding, in the case that the deep neural network is trained to provide the text encoding from the lip images.

Specifically, in the case that the content corresponding to the lip images is text encoding, the step of obtaining the image data corresponding to the lip images based on the acquired lip images includes: applying the deep neural network to the image data corresponding to the lip images; and identifying the text encoding corresponding to the lip images.

The lip language recognition method according to various embodiments of the present disclosure can be employed by a mobile terminal, wherein a mobile terminal has a sound mode and a silent mode, and the mobile terminal can switch between the sound mode and the silent mode.

In some embodiments of the present disclosure, the deep neural network is trained and established in the sound mode. In the silent mode, the content corresponding to lip images is identified using the deep neural network that was trained in the sound mode.

The lip language recognition method according to some embodiments of the present disclosure therefore can solve some technical problems in existing mobile communication technologies, where when a user makes a voice call in a public place, the user's privacy often is not protected while others may feel disturbed because of the user's voice. The lip language recognition method according to some embodiments disclosed herein can protect the user's privacy, and reduce the impact on other people nearby. In addition, various embodiments disclosed herein can save training time and improve training accuracy, as the training is performed in the sound mode during the user's regular usage of the mobile terminal.

In some embodiments, the method can include: starting the silent mode; acquiring the user's lip images; and identifying the content corresponding to the lip images using the deep neural network. In some embodiments, the "user's lip images" may refer to those other than the "lip images for training" described above. However, the "user's lip images" and the "lip images for training" are not necessarily always differentiated, and can sometimes refer to the same set of images, or different set images respectively in the silent mode and the sound mode.

In some embodiments, the lip language recognition method further includes a step 300: extracting the user's voice features according to the voice data corresponding to the lip images for training.

In Some Embodiments, Step 300 May Occur after Step 100. In Some Other Embodiments, Step 300 May Occur Simultaneously with Step 100.

According to some embodiments, the voice features include one or more of tone color, pitch, or volume, etc. For example, listeners can recognize this user based on one or more of such voice features.

In some embodiments, the lip language recognition method further includes synthesizing user-specific voice data according to the extracted user's voice features and the content corresponding to the lip images.

The synthesized user-specific voice data can be employed to regenerate realistic user voice having this specific user's voice characteristics, and the audience or listener(s) can potentially recognize this user based on one or more of the voice features synthesized into the voice data.

Therefore, according to some embodiments of the present disclosure, the audience or listener(s) can potentially hear the voice communication from this specific user as if the user were speaking directly without the terminals and the communication connection. Without such a voice synthesizer, the audience or listener(s) may hear often monotonic, machine-like sound, as the user voice may be distorted, or features in the voice may be reduced, (e.g., resulting from limited bandwidth, sound frequency dynamic range, data compression technologies, etc.) by the sending/receiving terminals and the communication network.

As such, user experience can be greatly improved by adopting the embodiments disclosed herein.

Figure 2:
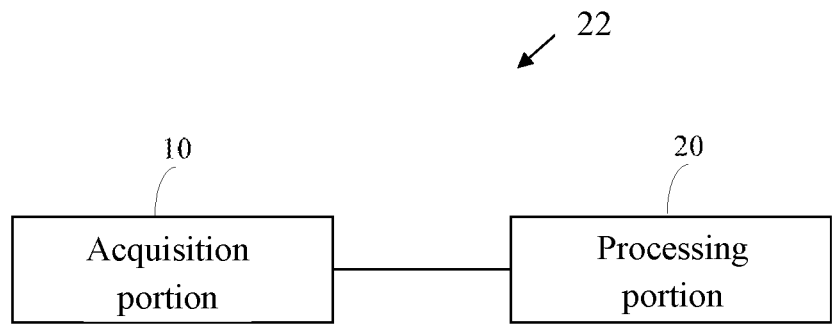
FIG. 2 is a schematic structural diagram of a mobile terminal according to some embodiments of the present disclosure.

FIG. 2 shows a schematic structural diagram of a mobile terminal 22 according to some embodiments. The mobile terminal 22 is provided with a sound mode and a silent mode, and can include an acquisition portion 10 and a processing portion 20.

Specifically, in the silent mode, the acquisition portion 10 is configured to collect the user's lip images. The processing portion 20 is in communication with the acquisition portion 10, and is configured to identify the content corresponding to the lip images according to a deep neural network.

Wherein, the deep neural network is established in the sound mode.

In some embodiments, a condition for activating the silent mode is a lip language recognition "ON" instruction as input by the user. For example, the user input to turn on the lip language recognition can be clicking a preset virtual button on a display screen during a voice call, or a voice instructing to start lip language recognition. In some other example, the user input to turn on the lip language recognition can be speaking to the local terminal in a voice that contains a predetermined set of key words, key phrases, or key sentences. Such key words, phrases, or sentences can include, for example, "it is inconvenient for me to speak now," or "secret," and when the words "secret" or "inconvenient" is recognized in the voice, the lip language recognition function is turned on.

In some embodiments, in the sound mode, the acquisition portion 10 is configured to acquire the lip images and the corresponding voice data for training; and the processing portion 20 is configured to obtain the corresponding image data according to the lip images for training. The image data can include pixel information, for example. The deep neural network is trained based on the image data and the voice data.

In some embodiments, in the sound mode, the acquisition portion 10 is configured to acquire the lip images and the corresponding voice data for training; and the processing portion 20 is configured to obtain the corresponding image data according to the lip images for training. The corresponding text encoding can be obtained according to the voice data corresponding to the lip images for training; and the deep neural network can be trained based on the image data and the text encoding.

Figure 3:
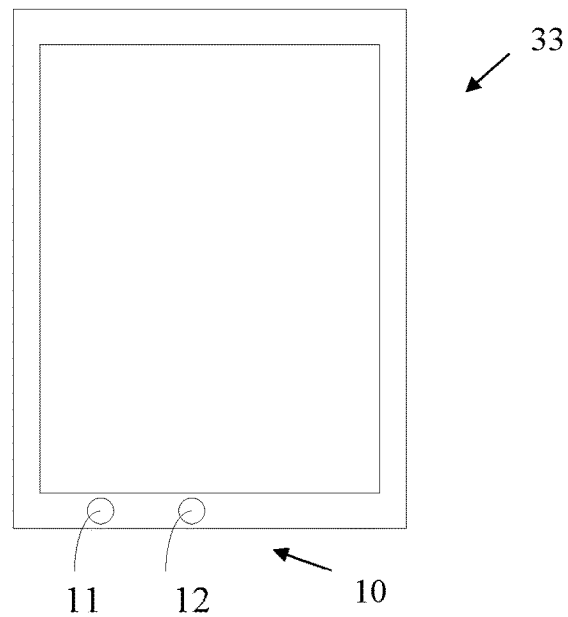
FIG. 3 is another schematic structural diagram of a mobile terminal according to some embodiments of the present disclosure.

FIG. 3 shows a schematic structural diagram of a mobile terminal 33 according to some embodiments of the present disclosure. As shown in FIG. 3, the mobile terminal 33 includes the acquisition 10. The acquisition portion 10 can include an imaging device 11, and a microphone device 12. The imaging device 11 can be used to collect lip language images and lip images for training. The microphone device 12 can be used to collect voice data for training.

In some embodiments, the imaging device 11 includes a camera or a video recorder, such as a built-in camera of the mobile terminal 33 (e.g., a smart phone or a tablet computer). It should be noted that the imaging device 11 can be disposed at a bottom of the mobile terminal 33 as illustrated in FIG. 3 as an example, or can be disposed at a side of the mobile terminal 33, a left-side edge, a right-side edge, a front side, a back side, etc.

In some embodiments, the microphone device 12 includes a built-in microphone of the mobile terminal 33 (e.g., a smart phone or a tablet computer). It should be noted that the microphone device 12 can be disposed at a bottom of the mobile terminal 33 as illustrated in FIG. 3 as an example, or can be disposed at a side of the mobile terminal 33, a left-side edge, a right-side edge, a front side, a back side, etc.

In some embodiments, in order to obtain lip images without affecting the microphone collecting voice data, the imaging device 11 is disposed at a left side of the microphone device 12.

In some embodiments, the processing portion 20 is specifically configured to use a deep neural network for the image data corresponding to the lip images to identify the text encoding corresponding to the lip images.

In some embodiments, the content corresponding to the lip language images includes the voice data or text encoding corresponding to the lip language images. It should be noted that the content corresponding to the lip language images is determined according to the training method for the deep neural network.

For example, if image data and voice data are used for training, the content corresponding to the lip language images is the voice data. If image data and text encoding are used for training, the content corresponding to the lip language images is the text encoding.

The mobile terminal according to some embodiments of the present disclosure is provided with a sound mode and a silent mode, and includes an acquisition portion and a processing portion. In the silent mode, the acquisition portion is configured to collect the user's lip images; the processing portion communicates with the acquisition portion and is configured to identify the content corresponding to the lip images according to the deep neural network, wherein the deep neural network is established in the sound mode.

According to various embodiments of the present disclosure, the deep neural network can be continuously trained in the sound mode, for example through user feedback, iterations, and machine learning, with various artificial intelligence (AI) techniques.

In the silent mode, the trained deep neural network is employed to recognize the content corresponding to the lip images. As such, when a user performs a call in public, the user can use the silent mode to have the lip language recognition function recognize the user's lip images without making a voice. This lip-reading method can therefore protect the user's privacy, and reduce the impact on the surroundings. Training time is reduced as the training can be performed in the sound mode, such as during the user's regular interactions with the mobile terminal, which also improves the training accuracy.

Figure 4:
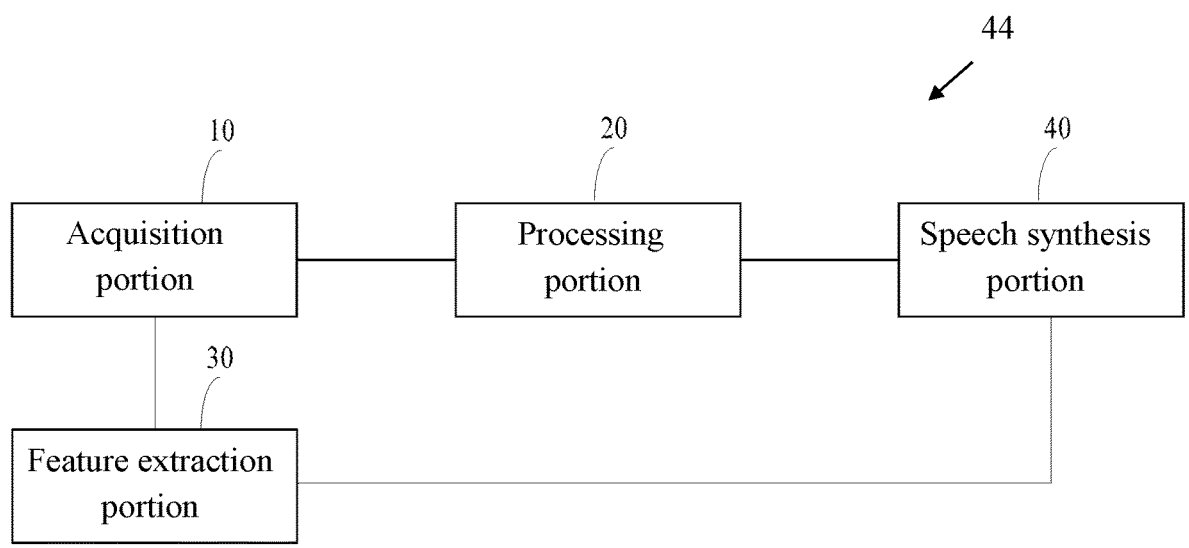
FIG. 4 is another schematic structural diagram of a mobile terminal according to some other embodiments of the present disclosure.

FIG. 4 shows another schematic structural diagram of a mobile terminal 44 according to some embodiments of the present disclosure. As shown in FIG. 4, the mobile terminal further includes a feature extraction portion 30 in a communicative connection with the acquisition portion 10.

The feature extraction portion 30 is configured to extract the user's voice features based on the voice data corresponding to the lip images for training. In some embodiments, the user can provide feedbacks to the feature extraction portion 30 for improved voice feature extraction. For example, the extracted user voice features can be synthesized back to voice for playing back to the user, and the user can adjust the features as desired, to more realistically reflect this user's voice features, or to include exaggerations, artistic, or other sound effects.

In some embodiments, the voice features include one or more of: tone color, pitch, or volume. Accordingly, the user can possibly adjust each, some, or all of these features, for saving to the mobile terminal/cloud, or for instant use.

In some embodiments, the mobile terminal further includes a speech synthesis portion 40. The speech synthesis portion 40 is in communication connection with the feature extraction portion 30 and the processing module 20.

The speech synthesis portion 40 is configured to synthesize voice data having the user's characteristics based on the extracted voice features and the content corresponding to the lip images. In some other embodiments, the user can download or create other sound features for synthesizing into sound or voice with desired sound effects.

For example, the user can download sound recording of celebrities, have the feature extraction portion 30 extract sound features of those celebrities, and have the speech synthesis portion 40 synthesize the extracted sound features into a voice resembling that of a celebrity.

In some other examples, the user can download sound recording of nature, music, animals, etc. Sound features can also be extracted from this variety of sound recordings, and used to synthesize sound or voice with desired sound effects.

In some embodiments, the extracted sound features can be blended/mixed with the extracted voice features of the specific feature, prior to the synthesis of the voice for communication.

In some embodiments, the mobile terminal 44 can further include a sending portion and a receiving portion.

In some embodiments, the sending portion is configured to encode the synthesized voice data and send the encoded data to a communication station, for example, through wireless communication.

In some embodiments, the receiving portion is configured to receive signals from the communication station and perform decoding and conversion into user-recognizable voice data.

In some embodiments, the mobile terminal 44 can further include a removable headset such as an earpiece for playing user-recognizable voice data converted by the receiving portion. The removable headset can also include one or more external microphones that can take the place of the internal microphone device 12.

In the following, the training of the deep neural network using the image data and text encoding is used as an example in a more detailed description of the method according to various embodiments of the present disclosure.

In the sound mode, during a voice communication, the imaging device 11 captures the user's lip images; the microphone device 12 collects the voice data corresponding to the lip images; the processing portion 20 obtains the image data according to the user's lip images, obtains the corresponding text encoding according to the voice data, and trains the deep neural network according to the image data and the text encoding.

The training results can be saved in memory or a storage device to guide the function of lip image recognition in the silent mode. Alternatively, the training results can be saved in a cloud. Similarly, the deep neural network can reside in the cloud to utilize the greater computing power of the cloud compared with the local mobile terminal.

In addition, the feature extraction portion 30 extracts voice features specific to the user from the voice data corresponding to the lip images. The voice features can also be saved to the memory or storage device, such as the internal memory of the mobile terminal 44, or in the cloud.

When the user chooses to communicate without voice, the silent mode can be turned on. The imaging device 11 captures the user's lip images; the processing portion 20 obtains the image data according to the lip images, and employs the deep neural network to recognize the text encoding according from the image data corresponding to the lip images. The recognized text encoding is transmitted to the speech synthesis portion 40, which synthesizes voice data having the user's characteristics by incorporating the voice features previously-saved in the sound mode and the recognized text encoding.

The sending portion encodes the voice data having the user's characteristics and sends the voice data to a communication station, for example, through a wireless communication channel. The receiving portion receives signals from the communication station for decoding, and plays the decoded signal through the headset.

Those of ordinary skill in the art will recognize that the example devices, device units, portions, modules, and algorithm steps described in conjunction with the embodiments disclosed herein can be implemented with hardware or a combination of computer software and hardware. Whether these functions are realized and performed using hardware and/or software depends on the specific applications and design constraints/choices. Those of ordinary skill in the art will also recognize that using different methods to implement the described functions for each specific application is also within the scope of the present disclosure.

Based on various embodiments of the present disclosure, the disclosed apparatuses, devices, and methods may be implemented in other manners. For example, the abovementioned terminals and devices are only of illustrative purposes, and other types of terminals and devices can employ the methods disclosed herein.

Dividing the terminal or device into different "portions," "modules," "components," or "blocks" merely reflect various logical functions according to some embodiments, and actual implementations can have other divisions of "portions," "modules," "components" or "blocks" realizing similar functions as described above, or without divisions. For example, multiple portions, modules, components, or blocks may be combined or can be integrated into another system. In addition, some features can be omitted, and some steps in the methods can be skipped.

Moreover, the illustrated or described mutual coupling between devices, portions, modules, components, such as direct coupling or communicative connection, can be through interfaces, devices, or functional blocks. Such a coupling can be electrical, mechanical, or have other forms.

In some embodiments, each functional portion in various embodiments of the present disclosure may be integrated in one processing circuit such as a processor. In some other embodiments, each portion can exist alone physically, or two or more portions may be integrated into one block or unit.

The functions as described above according to various embodiments of the present disclosure, if implemented in the form of software functional blocks and sold or used as a stand-alone product, may be stored in a computer-readable storage medium. Based on such understanding, some of the technical solutions of the present disclosure can be embodied in the form of a software product stored in a storage medium, including a plurality of instructions that are used to cause a computer device (which may be a personal computer, a mobile terminal, a server, or a network device, etc.) to perform all or part of the steps of the methods described in the various embodiments of the present disclosure.

Those of ordinary skill in the art will recognize that the functional blocks, methods, units, devices, and systems described in the present disclosure may be integrated or divided into different combinations of systems, units, devices, and functional blocks. Any suitable programming languages and programming techniques may be used to implement the routines of particular embodiments. Different programming techniques may be employed such as procedural or object-oriented. The routines may execute on a single processing device or multiple processors. Although the steps, operations, or computations may be presented in a specific order, the order may be changed in different particular embodiments. In some particular embodiments, multiple steps shown as sequential in this disclosure may be performed at the same time.

In some embodiments, a software or program code is provided to realize the method described above. The software or program code can be stored on any type of computer-readable medium or memory, such as a storage device including a disk or hard drive. The computer-readable medium may include a computer-readable medium or memory, such as computer-readable media that store data for short periods of time such as register memory, processor cache and Random-Access Memory (RAM). The computer-readable medium may also include non-transitory media or memory, such as secondary or persistent long-term storage, such as read-only memory (ROM), optical or magnetic disks, compact-disc read only memory (CD-ROM), flash drives such as U drives, for example.

The computer-readable media may also be any other volatile or non-volatile storage systems. The computer-readable medium may be considered a computer-readable storage medium, a tangible storage device, or other article of manufacture, for example. The software instructions can be stored in the computer-readable media, and also be contained in, and provided as, an electronic signal, for example in the form of software as a service (SaaS) delivered from a server (e.g., a distributed system and/or a cloud computing system).

Those of ordinary skill in the art will appreciate that the modules, circuits, units, portions, or components in the devices provided by various embodiments described above can be configured in the one or more devices described above. They can also be located in one or multiple devices that is (are) different from the example embodiments described above or illustrated in the accompanying drawings. For example, the modules, circuits, units, portions, or components in various embodiments described above can be integrated into one module or divided into several sub-modules.

The numbering of the various embodiments described above are only for the purpose of illustration, and do not represent preference of embodiments.

Different programming techniques may be employed such as procedural or object-oriented. The routines may execute on a single processing device or multiple processors. Although the steps, operations, or computations may be presented in a specific order, the order may be changed in different particular embodiments. In some particular embodiments, multiple steps shown as sequential in this specification may be performed at the same time.

A "processor" can be employed to realize some of the functions, devices, circuits, or methods described above, and can include any suitable hardware and/or software system, mechanism or component that processes data, signals or other information. A processor may include a system with a general-purpose central processing circuit, multiple processing circuits, dedicated circuitry for achieving functionality, or other systems.

Processing need not be limited to a geographic location, or have temporal limitations. For example, a processor may perform its functions in "real-time," "offline," in a "batch mode," etc. Portions of processing may be performed at different times and at different locations, by different (or the same) processing systems. Various embodiments disclosed herein can be realized via hardware and/or software, such as a computer program stored on a memory.

Although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the exemplary embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

The invention claimed is:

1. A lip language recognition method, applied to a mobile terminal having a sound mode and a silent mode, the method comprising:
    training a deep neural network in the sound mode;
    collecting a user's lip images in the silent mode;
    identifying content corresponding to the user's lip images with the deep neural network trained in the sound mode;
    identifying content corresponding to the user's lip images including at least one key phrase corresponding to an associated function performed by the mobile terminal; and
    starting the silent mode upon input of an associated key phrase; and
    recognizing by the mobile terminal through the user's lip movements without associated voice;
    the method further comprising:
    switching from the sound mode to the silent mode when a privacy need of the user arises.

2. The method of claim 1, wherein the training comprises:
    collecting lip images and corresponding voice data for training;
    obtaining image data corresponding to the collected lip images for training, the image data comprising pixel information; and
    training the deep neural network based on the image data and the voice data for training.

3. The method of claim 2, further comprising extracting one or more user's voice features based on the voice data for training.

4. The method of claim 3, wherein the user's voice features comprise at least one of tone color, pitch, or volume.

5. The method of claim 4, further comprising synthesizing user voice data having the user's voice features based on the extracted user's voice features and an associated function being associated with one or more items of content corresponding to the user's lip images.

6. The method of claim 1, wherein the training of the deep neural network comprises:
    collecting lip images and corresponding voice data for training;
    obtaining image data corresponding to the collected lip images for training, the image data comprising pixel information;
    obtaining text encoding corresponding to the voice data for training; and
    training the deep neural network based on the image data and the text encoding for training.

7. The method of claim 6, wherein the identifying the content corresponding to the user's lip images with the deep neural network comprises:
    obtaining user image data corresponding to the user's lip images; and
    identifying user text encoding corresponding to the user's lip images by applying the deep neural network on the user image data.

8. A mobile terminal having a sound mode and a silent mode, comprising:
    an acquisition portion; and a processing portion; wherein:

the acquisition portion is configured to acquire a user's lip images;

the processing portion being provided in communication with the acquisition portion and being configured to identify content corresponding to the user's lip images by utilizing a deep neural network established in the sound mode, wherein the processing portion is provided with a plurality of computer executable instructions to perform:

determining at least some content containing at least some information corresponding to the user's lip images including at least one key phrase corresponding to an associated function performed by the mobile terminal; and starting the silent mode by switching from the sound mode when a privacy need of the user arises and upon recognition of an associated key phrase;

wherein the associated key phrase is recognized by the mobile terminal through the user's lip movements without associated voice.

9. The mobile terminal of claim 8, wherein:

the acquisition portion is configured to acquire lip images and corresponding voice data for training in the sound mode;

the processing portion is configured to:
  obtain image data corresponding to lip images for training;
  obtain text encoding for training corresponding to the voice data for training; and
  train the deep neural network according to the image data and the text encoding for training.

10. The mobile terminal of claim 9, further comprising a feature extraction portion configured to obtain a user's voice features according to the voice data for training; wherein the voice features comprise at least one of tone color, pitch, or volume.

11. The mobile terminal of claim 10, further comprising a speech synthesis portion configured to synthesize voice data with the user's voice features according to the obtained voice features and the identified content.

12. The mobile terminal of claim 11, wherein the acquisition portion comprises an imaging device disposed at a bottom portion of the mobile terminal.

13. The mobile terminal according to claim 12, further comprising:
  a sending portion configured to encode the synthesized voice data and send the encoded synthesized voice data to a communication station wirelessly;
  a receiving portion configured to receive a signal from the communication station and perform decoding and conversion into user-recognizable voice data; and
  an earpiece configured to play the user-recognizable voice data decoded and converted by the receiving portion.

14. A non-transitory computer-readable medium having instructions stored on for execution by the mobile terminal of claim 13 for lip language recognition, the instructions comprising:

an imaging device capturing the lip images for training in a voice communication;

a microphone collecting the voice data corresponding to the lip images for training;

the processing portion obtaining the image data according to the lip images and text encoding corresponding to the voice data, and training the deep neural network based on the image data and the text encoding;

saving training results to guide the lip image recognition in the silent mode; and a feature extraction portion extracting from the voice data user's voice features and saving the extracted voice features.

15. The non-transitory computer-readable medium of claim 14, wherein the instructions further comprise:

the processing portion identifying the text encoding from the user's image data using the trained deep neural network, and transmitting the recognized text encoding to the speech synthesis portion;

the speech synthesis portion synthesizing voice data having the voice features, the voice features being based on one or more voice features saved in the sound mode and the recognized text encoding;

the sending portion encoding and sending the voice data having the voice features to a communication station wirelessly; and the receiving portion receiving from the communication station the voice for decoding.

16. The non-transitory computer-readable medium of claim 15, wherein the instructions further comprise:

downloading sound recording;

the feature extraction portion extracting sound features from the downloaded sound recording; and mixing the extracted sound features with the saved voice features prior to the synthesizing.

17. The non-transitory computer-readable medium of claim 16, wherein the instructions further comprise:

obtaining user feedbacks on the text encoding for training; and training the deep neural network with the obtained user feedbacks.

18. The mobile terminal of claim 9, wherein the processing portion is further configured to identify the text encoding for training using the deep neural network.

19. The mobile terminal of claim 8, wherein:

the acquisition portion is configured to collect, with an imaging device and a microphone device, lip images and corresponding voice data for training, in the sound mode; and the processing portion is configured to:
  obtain image data including pixel information based on the collected lip images for training; and
  train the deep neural network according to the image data and the voice data for training.

* * * * *